US011038687B2

(12) United States Patent
Jones et al.

(10) Patent No.: US 11,038,687 B2
(45) Date of Patent: *Jun. 15, 2021

(54) DATA COLLABORATION (71) Applicant: PushPull Technology Limited, London (GB)

(72) Inventors: David Jones, London (GB); Daniel Eccleston, Herts (GB)

(73) Assignee: PushPull Technology Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,608

(22) Filed: Feb. 21, 2018

(65) Prior Publication Data
US 2018/0183810 A1 Jun. 28, 2018

Related U.S. Application Data (63) Continuation-in-part of application No. 14/832,077, filed on Aug. 21, 2015.

(51) Int. Cl.
| | |
|---|---|
| *H04L 29/06* | (2006.01) |
| *H04L 9/32* | (2006.01) |
| *H04W 4/02* | (2018.01) |
| *H04L 12/18* | (2006.01) |
| *H04L 29/08* | (2006.01) |

(Continued)

(52) U.S. Cl.
CPC ............ *H04L 9/3234* (2013.01); *G06F 21/40* (2013.01); *G06F 21/6218* (2013.01); *H04L 9/088* (2013.01); *H04L 12/1813* (2013.01); *H04L 12/1822* (2013.01); *H04L 63/104* (2013.01); *H04L 63/20* (2013.01); *H04L 67/22* (2013.01); *H04W 4/02* (2013.01); *H04W 4/029* (2018.02); *H04L 41/0893* (2013.01); *H04W 4/023* (2013.01); *H04W 4/80* (2018.02)

(58) Field of Classification Search
CPC .... G06F 63/107; G06F 21/40; G06F 21/6218; H04L 67/22; H04L 63/061; H04L 67/18; H04L 9/3234; H04L 9/1813; H04L 9/088; H04L 12/1822; H04L 63/104; H04L 63/20; H04W 4/029; H04W 4/02
See application file for complete search history.

(56) References Cited

U.S. PATENT DOCUMENTS

| | | | | |
|---|---|---|---|---|
| 5,941,945 A | * | 8/1999 | Aditham | ............... G06F 9/542 709/205 |
| 6,289,333 B1 | * | 9/2001 | Jawahar | ............. G06F 11/3495 |

(Continued)

FOREIGN PATENT DOCUMENTS

| | | |
|---|---|---|
| EP | 1701566 A1 | 9/2006 |
| WO | WO-2007049267 A1 | 5/2007 |
| WO | WO-2011064760 A1 | 6/2011 |

*Primary Examiner* — Tongoc Tran
(74) *Attorney, Agent, or Firm* — Harness, Dickey & Pierce, P.L.C.

(57) ABSTRACT

A method and system are provided for enabling collaborative access to a data object. The method comprises establishing an access control policy, the access control policy defining at least one collaborative condition under which access to the data object is permissible, monitoring a plurality of users for compliance with the collaborative condition and providing access to the data object after a predetermined number of the users meet the at least one collaborative condition.

27 Claims, 5 Drawing Sheets

(51) Int. Cl.
  G06F 21/40 (2013.01)
  H04W 4/029 (2018.01)
  G06F 21/62 (2013.01)
  H04L 9/08 (2006.01)
  H04W 4/80 (2018.01)
  H04L 12/24 (2006.01)

(56) References Cited

U.S. PATENT DOCUMENTS

| | | | | |
|---|---|---|---|---|
| 6,378,001 | B1* | 4/2002 | Aditham | G06Q 10/06 |
| | | | | 719/313 |
| 6,732,145 | B1* | 5/2004 | Aravamudan | H04L 67/26 |
| | | | | 709/204 |
| 7,007,235 | B1* | 2/2006 | Hussein | G06Q 10/10 |
| | | | | 715/751 |
| 7,024,451 | B2* | 4/2006 | Jorgenson | H04L 29/06 |
| | | | | 709/203 |
| 7,143,136 | B1* | 11/2006 | Drenan | G06Q 10/10 |
| | | | | 709/204 |
| 7,162,699 | B1* | 1/2007 | Pena-Mora | G06F 3/0481 |
| | | | | 709/204 |
| 8,782,122 | B1* | 7/2014 | Chang | H04L 67/1048 |
| | | | | 709/202 |
| 9,003,499 | B2* | 4/2015 | Diem | G06Q 10/00 |
| | | | | 726/4 |
| 9,413,739 | B1* | 8/2016 | Rose | H04L 63/08 |
| 9,449,182 | B1* | 9/2016 | Dang | H04L 51/04 |
| 9,503,902 | B1* | 11/2016 | Coney | H04W 76/10 |
| 2004/0093397 | A1* | 5/2004 | Chiroglazov | G06Q 10/025 |
| | | | | 709/219 |
| 2004/0181416 | A1* | 9/2004 | Lee | G06F 21/629 |
| | | | | 726/28 |
| 2005/0144333 | A1 | 6/2005 | Kotzin | |
| 2008/0215682 | A1* | 9/2008 | Vilis | H04L 63/101 |
| | | | | 709/204 |
| 2009/0241121 | A1* | 9/2009 | Nechushtai | G06Q 10/10 |
| | | | | 718/104 |
| 2011/0107231 | A1 | 5/2011 | Gueldemeister | |
| 2012/0192086 | A1 | 7/2012 | Ghods et al. | |
| 2013/0145284 | A1 | 6/2013 | Anantharaman et al. | |
| 2014/0149771 | A1 | 5/2014 | Krishna et al. | |
| 2014/0173700 | A1* | 6/2014 | Awan | H04L 63/107 |
| | | | | 726/4 |
| 2014/0280955 | A1* | 9/2014 | Stuntebeck | H04L 63/0435 |
| | | | | 709/226 |
| 2014/0351334 | A1* | 11/2014 | Bandyopadhyay | H04L 67/16 |
| | | | | 709/204 |
| 2015/0180902 | A1* | 6/2015 | Biswas | H04L 63/20 |
| | | | | 726/1 |
| 2015/0271206 | A1* | 9/2015 | Schultz | G06F 21/6236 |
| | | | | 726/3 |
| 2016/0036854 | A1* | 2/2016 | Himawan | H04L 63/20 |
| | | | | 726/5 |
| 2016/0212109 | A1 | 7/2016 | Hird | |
| 2016/0219074 | A1* | 7/2016 | Barajas Gonzalez | H04L 63/20 |
| 2016/0323390 | A1 | 11/2016 | Han et al. | |

* cited by examiner

DATA COLLABORATION

CROSS-REFERENCE TO RELATED APPLICATIONS

This application is a continuation-in-part of U.S. patent application Ser. No. 14/832,077, filed on Aug. 21, 2015. The entire disclosure of the above application is incorporated herein by reference.

FIELD

The present disclosure relates to the management of data, and in particular to the management of data between a number of parties. It has particular applicability to the management of access to data, such as read or write access to data.

BACKGROUND

Technological development is leading to acceleration in growth of the volume of data available to individuals throughout the world. Storage and communication capabilities are exponentially increasing leading to a revolution in the way information is managed and accessed.

In particular, data is now shared as never before. Individual items of data will be copied many times over with all interested parties. Open networks are designed to facilitate this copying, while various security processes have been developed to restrict access. However, these approaches struggle to find the balance between users' needs, particularly when multiple users have a legitimate interest in a certain piece of data.

For example, when data such as a document is collaboratively created or edited, the conventional approach is for various versions of the document to be shared through various iterations of the editing process. This creates difficulties for version control, particularly where multiple users work on a document at the same time. Solutions have been proposed to allow real time collaborative editing, but these have not gained sufficient traction in the market to replace the document sharing approach, partly due to inefficiencies and counter-intuitive interfaces.

Even when a document is created by a single user, there is still a lack of flexibility in current arrangements for sharing that document. Either it is shared freely without any technical hindrance, in which case the original user loses all control of the document, or the user applies some kind of document security in which case document access by other parties is highly restricted. There is in effect a binary distinction between the user deciding to share a piece of data with another or deciding to prevent access to that data by the other user.

There is a need for greater flexibility in data sharing. At present, behaviours do not take full advantage of the technology available. In the scenario where a user wishes to share a piece of data with another but only temporarily, for example, this is still often achieved by providing a physical artefact carrying the data that can be later retrieved (one reason for the continuing use of paper in many environments). Alternatively, digital data on a single physical device is temporarily shared by sharing that physical device. One can imagine the scenario in which a user would like to show a friend a photograph, but does not necessarily want that friend to retain the photograph indefinitely. In practice, the camera or smartphone containing the image is simply physically handed between the parties.

Increasingly, individuals carry portable computing devices, such as smartphones or tablet computers, on their person. While wireless communications protocols such as Bluetooth have been developed to allow ready transfer of data between such devices, they do not account for the use scenarios in which control of the data shared is desired.

Ultimately, there remain a range of scenarios in which users' intuitive expectations about data ownership and control are not matched by the technological means available to them. Users by instinct adopt ad hoc approaches to overcome these hurdles, but this is inefficient, impractical and does not promote optimal collaboration between users.

SUMMARY

According to a first aspect there is provided a method for enabling collaborative access to a data object, comprising:
  establishing an access control policy, the access control policy defining at least one collaborative condition under which access to the data object is permissible;
  monitoring a plurality of users for compliance with the collaborative condition; and
  providing access to the data object after a predetermined number of the users meet the at least one collaborative condition.

The first aspect can enable access to a data object, such as a data file, in dependence on users' compliance with at least one collaborative condition. Moreover, access is provided after a predetermined number of users meet that condition. In this manner, a flexible access system is provided which does not deny access completely or allow it unconditionally, instead the collaborative process is aided by the access control policy which reflects the desired conditions under which access should be allowed. Moreover, one element of the control over access is that a sufficient number of users must have complied with a collaborative condition; this gives an intuitive sense of the collaboration process, connecting access conditions to the collaboration between multiple users. The predetermined number of users may also be specified by the access control policy.

In some examples, there may be multiple collaborative conditions. In addition, the step of providing access may occur after a predetermined number of users meet all the collaborative conditions.

In preferred embodiments, there is further provided a step of preventing access to the data object when the predetermined number of users no longer meet the collaborative condition. That is to say, in such embodiments access is only provided while the condition is met by the predetermined number of users. Alternative embodiments may continue to provide access even after some or all users cease to meet the collaborative condition. They may be a defined period of time during which access continues to be provided after the predetermined number of users no longer meet the access criteria. The approach may thus provide appropriate levels of continued access to the data object.

Furthermore, the access control policy may specify a threshold number of users above which access to the data object may be prevented. The threshold number may be the same as the predetermined number of users required to allow access to the data, or it may be a higher number.

The step of monitoring may comprise regularly polling one or more devices associated with the users to assess compliance with the collaborative condition. In this manner, a regular process may be established for establishing compliance with the collaborative condition. Alternative approaches may comprise continuous monitoring of devices, or user-activated monitoring (i.e. monitoring that takes place when initiated by a user).

In preferred embodiments, the step of monitoring may comprise monitoring one or more signals emitted by devices associated with the users. The one or more signals may be "heartbeat" signals issued at regular intervals. The presence of the heartbeat signals may imply proximity of the device and thus the associated user.

Data relating to monitoring for compliance with the collaborative condition may be stored centrally. Alternatively, the data could be distributed using distributed ledger technology (DLT) or Blockchain.

The collaborative condition may be a geographical condition. Such a condition may be an absolute condition or a relative condition. Absolute geographical conditions are conditions defined with reference to a fixed geographical point, while relative conditions are conditions defined with reference to the relative geographical locations of one or more users. The geographical location of a user may be assumed to be that of an associated user device.

As an example of an absolute geographical condition, the collaborative condition may be that a user is within a predefined distance of a set geographical point. Accordingly, once the predetermined number of users are within that predefined distance of the set point, then access may be provided to the data file.

As examples of a relative geographical condition, the collaborative condition may be that the predetermined number of users are within a set distance of one another or that signals from the user devices can be received (thus implying a degree of proximity). For instance, if predetermined number of users are within a room together, then the data object may be accessible. In this manner, the access control policy acts to establish a quorum for access to the data object. As such, when a group of users convene in sufficient numbers, then access to the data object is provided.

The step of monitoring for compliance with the collaborative condition may comprise determining the geographic location of devices associated with the users using one or more of: global positions system (GPS), general packet radio service (GPRS), beacon or internet protocol (IP) address information. Alternatively, other techniques for inferring the location of a device may be used as appropriate.

The access control policy may define a plurality of collaborative conditions. For example, the access control policy may define both absolute and relative geographic collaborative conditions. In this example, it is not merely sufficient that a quorum of users are located proximal to each other (in order to meet the relative geographic condition) but they must also meet at a defined location (in order to meet the absolute geographic condition).

The access control policy may also comprise a temporal condition. This temporal condition may define times during which access to the data object is to be provided. As such, the step of providing access to the data object may be dependent on compliance with the temporal condition. This may be in addition to compliance with the at least one collaborative condition. As such, even if the collaborative condition is met by the predetermined number of users, access may not be provided unless the temporal condition is also met. For example, the access control policy may define that a data object will be open for access during a meeting at a set time and place, but only if a sufficient number of participants are present.

The access policy may also comprise a relative temporal condition, specifying that the predetermined number of users must meet one or more collaborative conditions within a certain time period. For example, it could be specified that the predetermined number of users must all meet a certain geographic condition within a set time period relative to each other.

A collaborative condition may comprise the use of a predefined device by each user. A device may be predefined in the sense that it is specified or identified, for example in the access control policy, as a device which users may use to meet the collaborative condition. Once a predetermined number of users are using a predefined device, then access to the data object may be provided.

The predefined devices may not be associated with particular users. For example, device A, device B and device C may all be predefined as devices which may be used by users to meet the collaborative condition. User A, User B and User C may use any of device A, device B and device C to meet the collaborative condition.

When each predefined device is not associated with a particular user, the presence of the user i.e. the meeting of the collaborative condition by that particular user can still be monitored. For example, a biometric log-on to the predefined device could be required.

Alternatively, the predefined devices may be associated with particular users. The devices may be associated with the users in the access control policy. Preferably, a single, specific device may be associated with each user. For example, User A, User B and User C may be associated with client device A, client device B and client device C, respectively. Alternatively, a plurality of devices may be associated with each user and the use of any one of those devices may count towards the meeting of the collaborative condition.

When each predefined device is associated with a particular user, the use of a predefined device can be used to indicate the presence of a user i.e. the meeting of the collaborative condition by that particular user.

To ensure that the device cannot be used when the legitimate user is not present some type of verification (e.g. PIN entry by the user or biometric identification) may be required.

The one or more devices include but are not limited to personal computers (PCs), mobile phones, tablet devices, wearable devices, beacons and electro-biological implants. Further details regarding suitable client devices are set out in the detailed description.

Identification of the predefined devices may be by means of the device MAC address or assigned IP address or some other similar label or identifier which could be shared with an authentication service in order to establish presence.

This collaborative condition may be used in combination with a temporal condition. For example, access to the data object may be provided when the predetermined number of users use a predefined device within a time period specified with reference to a set time point or period (an absolute temporal condition) or within a time period specified with reference to an event such as another user complying with this collaborative condition (a relative temporal condition).

This collaborative condition may also be combined with a geographical condition, such that, for example, access to the data object is provided when the predetermined number of users use a predefined device within a predefined distance of a set geographical point (an absolute geographical condition) or within a set distance of one another (a relative geographical condition).

Collaborative conditions may take alternative forms which are not tied to the physical location or other properties of a device. For example, a collaborative condition may be associated with online access by a user. Once sufficient users have signed in online (i.e. a predetermined number of users have met the collaborative condition of sign in) then access to the data object may be provided.

A collaborative condition may comprise the use of a predefined application by each user. An application may be predefined in the sense that it is specified or identified, for example in the access control policy, as an application which users may use to meet the collaborative condition. Once a predetermined number of users are using, have logged on to or otherwise accessed a predefined application, such that an instance of one of the applications is running on each of their devices, then access to the data object may be provided.

The predetermined number of users may be required to log on to the same, single application. Alternatively, the predetermined number of users may be required to log on to any one of a plurality or set of predefined applications.

The predefined applications may not be associated with particular users. For example, application A, application B and application C may all be predefined as applications which may be used by users to meet the collaborative condition. User A, User B and User C may use any of application A, application B and application C to meet the collaborative condition.

When each predefined application is not associated with a particular user, the presence of the user i.e. the meeting of the collaborative condition by that particular user can still be monitored. For example, the users may be required to enter a username to access a remote service implementing the method of the invention.

Alternatively, the predefined applications may be associated with particular users. The applications may be associated with the users in the access control policy. A single, specific application may be associated with each user. For example, User A, User B and User C may be associated with application A, application B and application C, respectively. Alternatively, a plurality of applications may be associated with each user and the use of any one of those applications may count towards the meeting of the collaborative condition. The applications associated with each user may be the same applications or different applications.

Where a predefined application is associated with a particular user, the use of the predefined application can be used to indicate the presence of a user i.e. the meeting of the collaborative condition by that particular user.

The one or more predefined applications preferably comprise applications that allow data creation, sharing and/or viewing. They may comprise mobile applications. Suitable applications include but are not limited to Slack, Skype and WhatsApp.

Identification of the predefined applications may be by some generic convention or standard for application naming or by means of an implementation specific set of identifiers, either of which could be shared with an authentication service in order to establish presence.

This collaborative condition may be used in combination with a temporal condition. For example, access to the data object may be provided when the predetermined number of users use one or more predefined applications within a time period specified with reference to a set time point or period (an absolute temporal condition) or within a time period specified with reference to an event such as another user complying with this collaborative condition (a relative temporal condition).

This collaborative condition may be combined with a geographical condition, such that, for example, access to the data object is provided when the predetermined number of users use one or more predefined applications within a predefined distance of a set geographical point (an absolute geographical condition) or within a set distance of one another (a relative geographical condition). Once the predetermined number of users meet the at least one collaborative condition, access to the data object may be provided to those users that have met the collaborative condition. Access to the data object may also be provided to other parties, including other users, devices or applications, instead of or in addition to those users. These other parties may be specified in the access control policy. They may include users that were monitored in accordance with the present invention but which did not meet the collaborative condition.

The data object may be stored centrally. Alternatively, the data object could be distributed using distributed ledger technology (DLT) or Blockchain.

In a preferred embodiment, the data object is encrypted, and the step of providing access comprises sharing an encryption key. As such, the data object can be secured until the desired time. In preferred embodiments, the data object is encrypted and the encryption key is split into a number of parts using a secret sharing algorithm so that the key cannot be reconstituted unless a specified number of the parts are recombined. A piece of the key is allocated to each of the users, wherein the predetermined number of the users represents the number of parts of the encryption key required to access the data object. In this manner, the requirement for the predetermined number of users to meet the collaborative condition can be enforced, since unless that number is present then the encryption key cannot be reconstructed in order to retrieve the data object.

In preferred embodiment, the data object is shared together with the access control policy. In particular, the method may comprise sharing the data object prior to the step of monitoring the plurality of users for compliance with the collaborative condition. As such, each device may receive a copy of the data object (which may be encrypted) together with the access control policy. As a result, the policy may be applied locally without the need to transmit the data object at the point at which access is provided. Alternatively, the access control policy may be maintained by a controlling device, which then may initiate access when required at each device.

It can also be appreciated that aspects of the disclosure can be implemented using computer program code. Indeed, according to a further aspect of the present disclosure, there is therefore provided a computer program product comprising computer executable instructions for carrying out the method of the first aspect. The computer program product may be a physical/tangible storage medium. For example, the storage medium may be a Read Only Memory (ROM) or other memory chip. Alternatively, it may be a disk such as a Digital Versatile Disk (DVD-ROM) or Compact Disk (CD-ROM) or other data carrier. It could also be a signal such as an electronic signal over wires, an optical signal or a radio signal such as to a satellite or the like. The disclosure also extends to a processor running the software or code, e.g. a computer configured to carry out the method described above.

According to a yet further aspect there is provided a system for enabling collaborative access to a data object, comprising processing means configured to:

establish an access control policy, the access control policy defining at least one collaborative condition under which access to the data object is permissible;

monitor a plurality of users for compliance with the collaborative condition; and provide access to the data object after a predetermined number of the users meet the at least one collaborative condition.

The processing means may be a single device or may be distributed across a plurality of devices. Preferred features of the first aspect may equally apply to this aspect.

In another aspect, predefined devices may be monitored for compliance with a collaborative condition, instead of users. The mere presence of the device, irrespective of who is in control of it, may be enough to meet the collaborative condition. These predefined devices comprise specific devices that may be identified in the access control policy. Preferably, they are devices permitted to access the data object. Preferably, these devices are not associated with particular users.

This aspect therefore provides a method for enabling collaborative access to a data object, comprising;

establishing an access control policy, the access control policy specifying predefined devices and at least one collaborative condition under which access to the data object is permissible;

monitoring a plurality of the devices for compliance with the collaborative condition; and providing access to the data object after a predetermined number of the devices meet the at least one collaborative condition.

These devices may be identified in the access control policy, for example by means of the device MAC address or assigned IP address or some other similar label or identifier.

Details and preferred features of the other embodiments and aspects of the invention described herein apply mutatis mutandis to this aspect of the invention.

For example, the collaborative condition may be temporal. Access to the data object may be provided when a predetermined number of the predefined devices are present, used, turned on or otherwise activated within a time period specified with reference to a set time point or period (an absolute temporal condition) or within a time period specified with reference to an event such as another predefined device complying with this collaborative condition (a relative temporal condition). The act of turning on or otherwise activating the predefined devices may need to be performed within the time period. Alternatively, it may be sufficient that the devices are present, being used or are on or active when the time period begins.

The collaborative condition may be a geographical condition, such that, for example, access to the data object is provided when the predetermined number of the predefined devices are within a predefined distance of a set geographical point (an absolute geographical condition) or within a set distance of one another (a relative geographical condition).

The collaborative condition may be the use of one or more predefined applications on a predetermined number of the predefined devices.

While the predefined devices may not be associated with particular users, some type of verification (e.g. PIN entry by the user or biometric identification) may be required before the device can be used, turned on or otherwise activated.

Once the predetermined number of predefined devices meet the at least one collaborative condition, access to the data object may be provided to those predefined devices that have met the collaborative condition. Access to the data object may also be provided to other devices, users or applications instead of or in addition to those predefined devices that have met the collaborative condition. These other devices, users or applications may be specified in the access control policy. They may include devices that were monitored in accordance with the present invention but which did not meet the collaborative condition.

A further aspect provides a computer program product comprising computer executable instructions for carrying out the method of the aspect described above.

Also provided is a system for enabling collaborative access to a data object, comprising processing means configured to:

establish an access control policy, the access control policy specifying predefined devices and at least one collaborative condition under which access to the data object is permissible;

monitor a plurality of the devices for compliance with the collaborative condition; and provide access to the data object after a predetermined number of the devices meet the at least one collaborative condition.

In another aspect, predefined applications may be monitored for compliance with a collaborative condition, instead of users. The mere presence of the application, irrespective of who is in control of it, may be enough to meet the collaborative condition. These predefined applications comprise one or more specific applications that may be identified in the access control policy. Preferably, they are applications that are permitted to access the data object. Preferably, these applications are not associated with particular users.

This aspect therefore provides a method for enabling collaborative access to a data object, comprising;

establishing an access control policy, the access control policy specifying one or more predefined applications and at least one collaborative condition under which access to the data object is permissible;

monitoring a plurality of the applications for compliance with the collaborative condition; and providing access to the data object after a predetermined number of the applications meet the at least one collaborative condition.

The predetermined number of applications may comprise a predetermined number of different applications, a predetermined number of instances of the same application, or a combination of the two, for example a single use of one or more applications in combination with multiple instances of the same application(s), the total equaling the predetermined number of applications.

Identification of the predefined applications may be by some generic convention or standard for application naming or by means of an implementation specific set of identifiers, either of which could be shared with an authentication service in order to establish presence.

Details and preferred features of the other embodiments and aspects of the invention described herein apply mutatis mutandis to this aspect of the invention.

For example, the collaborative condition may be temporal. Access to the data object may be provided when a predetermined number of the predefined applications are used, logged on to or otherwise accessed such that, for example, a predetermined number of instances of the application are running on respective user devices, within a time period specified with reference to a set time point or period (an absolute temporal condition) or within a time period specified with reference to an event such as another predefined application complying with this collaborative condition (a relative temporal condition). The act of logging on to or otherwise accessing the predefined applications may need to be performed within the time period. Alternatively, it may be sufficient that the applications are being used when the time period begins.

The collaborative condition may be a geographical condition, such that, for example, access to the data object is provided when the predetermined number of the predefined applications are being used within a predefined distance of a set geographical point (an absolute geographical condition) or within a set distance of one another (a relative geographical condition).

While the predefined applications may not be associated with particular users, some type of verification (e.g. PIN entry by the user or bio-metric identification) may be required before the application can be used, logged on to or otherwise accessed.

Alternatively, no user login or end user authentication may be required for the predefined application. The predefined application may connect to a central server, service, data source or other predefined application to establish the presence of the application and the meeting of the collaborative condition.

Once the predetermined number of predefined applications meet the at least one collaborative condition, access to the data object may be provided to those predefined applications that have met the collaborative condition. Access to the data object may also be provided to other applications, devices or users instead of or in addition to those predefined applications that have met the collaborative condition. These other applications, devices or users may be specified in the access control policy. They may include applications that were monitored in accordance with the present invention but which did not meet the collaborative condition.

A further aspect provides a computer program product comprising computer executable instructions for carrying out the method of the aspect described above.

Also provided is a system for enabling collaborative access to a data object, comprising processing means configured to:

establish an access control policy, the access control policy specifying one or more predefined applications and at least one collaborative condition under which access to the data object is permissible;

monitor a plurality of the applications for compliance with the collaborative condition; and provide access to the data object after a predetermined number of the applications meet the at least one collaborative condition.

In another aspect, the data object may comprise a plurality of constituent data sets and predefined constituent data sets may be monitored for compliance with a collaborative condition, instead of users. The mere presence of the constituent data set may be enough to meet the collaborative condition. For example, the data object may comprise a broad superset of data which cannot be accessed until a predetermined number of the constituent data sets are present i.e. meet the collaborative condition. Preferably, these predefined constituent data sets are not associated with particular users.

This aspect therefore provides a method for enabling collaborative access to a data object which comprises constituent data sets, the method comprising;

establishing an access control policy, the access control policy specifying predefined constituent data sets and at least one collaborative condition under which access to the data object is permissible;

monitoring a plurality of the constituent data sets for compliance with the collaborative condition; and providing access to the data object after a predetermined number of the constituent data sets meet the at least one collaborative condition.

The constituent data sets may be present on a user's device or a centrally stored location. They may be determined to be present at either of these locations by, for example, checking whether a correct version of the data set is present. This may be done using various validation techniques such as checking timestamps on the data set or checking implementation-specific key data labels.

Details and preferred features of the other embodiments and aspects of the invention described herein apply mutatis mutandis to this aspect of the invention.

For example, the collaborative condition may be temporal. Access to the data object may be provided when a predetermined number of the predefined constituent data sets are present, for example on user's devices, within a time period specified with reference to a set time point or period (an absolute temporal condition) or within a time period specified with reference to an event such as another predefined constituent data set complying with this collaborative condition (a relative temporal condition).

The collaborative condition may be a geographical condition, such that, for example, access to the data object is provided when the predetermined number of the predefined constituent data sets are present, for example on user's devices, within a predefined distance of a set geographical point (an absolute geographical condition) or within a set distance of one another (a relative geographical condition).

While the predefined constituent data sets may not be associated with particular users, some type of verification (e.g. PIN entry by the user or biometric identification) may be required before the constituent data sets can be present.

Once the predetermined number of predefined constituent data sets meet the at least one collaborative condition, access to the data object may be provided. The data object may be provided to the devices or applications on which each of the constituent data sets that meet the collaborative condition are present. Access to the data object may also be provided to other devices or applications instead of or in addition to those on which the each of the constituent data sets that meet the collaborative condition are present. They may include devices and applications on which constituent data sets are present but which did not meet the collaborative condition.

A further aspect provides a computer program product comprising computer executable instructions for carrying out the method of the aspect described above.

Also provided is a system for enabling collaborative access to a data object which comprises constituent data sets, the system comprising processing means configured to:

establish an access control policy, the access control policy specifying predefined constituent data sets and at least one collaborative condition under which access to the data object is permissible;

monitor a plurality of the constituent data sets for compliance with the collaborative condition; and provide access to the data object after a predetermined number of the constituent data sets meet the at least one collaborative condition.

DRAWINGS

Specific embodiments of the present invention will now be described by way of example with reference to the accompanying drawings, in which.

DETAILED DESCRIPTION

Figure 1:
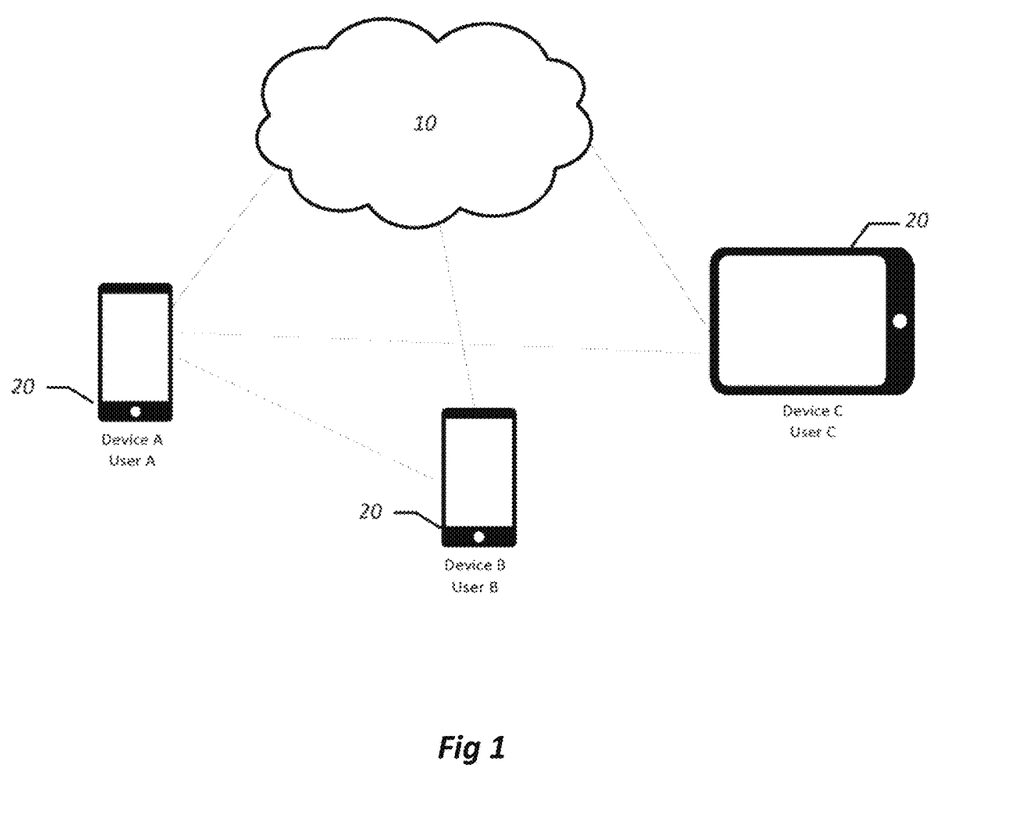
FIG. 1 illustrates a system architecture for implementing an embodiment.

Referring to FIG. 1, there is provided a data sharing system in accordance with a preferred embodiment. The data sharing system comprises an access-controlled remote service 10 and plurality of client devices 20. The plurality of devices 20 are coupled to a secure and access-controlled remote service 10.

The remote service 10 of the embodiment shown in FIG. 1 is a cloud service. The remote service may be implemented on one or more servers and may generally be implemented on a network such as the internet. The remote service may therefore route communications between connected entities and manage data transfer.

The client devices 20 are not limited by form factor and may have various capabilities. In many examples, the client devices 20 are portable but this is not essential. Client devices 20 that may be used in accordance with the present disclosure include personal computers (PCs), mobile phones, tablet devices, wearable devices and electro-biological implants.

The client devices 20 comprise network interfaces which allow them to communicate with other entities across the remote service 10 or directly or indirectly with each other.

The client devices 20 each comprise an input (such as a touchscreen or keyboard) and a display allowing interaction between a user and the client device 20. Each client device 20 is running an instance of an application that allows data creation, sharing and viewing. The data may be any form of data including, but not limited to: text data, image data, video data and audio data.

Each client device 20 may also comprise one or more further communication interfaces, allowing the client devices to be capable of communicating with each other using NFC, Bluetooth, Wi-Fi direct, local Wi-Fi or other communication mechanism.

The client devices 20 of this embodiment further comprise a location tracking means. For example, to enable geographic access control each device 20 may be able to obtain its physical location via known methods such as the Global Positioning System (GPS), or using General Packet Radio Service (GPRS), or using a beacon or IP address information in a manner known in the art.

Each client device 20 also comprises storage. This enables the client device to store data files, application files and other content required for full operation of the client device 20.

The data object and the data relating to monitoring for compliance with the collaborative condition may be stored centrally, for example on the servers implementing the remote service 10. Alternatively, the data object could be distributed using distributed ledger technology (DLT) or Blockchain.

In an example scenario, each client device 20 is associated with a different user. In FIG. 1, these are User A, User B and User C associated with client device A, client device B and client device C respectively. Collectively, the users wish to access a particular data item in a controlled manner. For example, there may be a desire for a particular piece of data to be accessed when the users congregate for a meeting. Control may be effected such that the data is only viewable and/or editable when a sufficient number of users are present.

This control is implemented using an access control policy associated with the data. The access control policy defines at least one collaborative condition under which access to the data file is permissible, the set of users who are permitted to access the data and also specifies a predetermined number of users which must meet this condition before access is granted. Access may comprise read only or read and write access, for example, and different conditions may be set for different types of access.

The access control policy may be stated in terms of: objects; object bindings; constraints; identities; and responsibilities. The objects are things that are subject to the policy, such as particular data items. The object bindings represent relationships between objects. Constraints may define behaviour that controls/modifies the scope and applicability of the object bindings. The identities may be attached to objects, but could also be used, in a more general way, to name anything in the policy, i.e. identities might be typed, e.g. group identities. Responsibilities can define permissions/capabilities, roles and permissible actions.

In this embodiment, the access control policy is associated with the data, but it may additionally or alternatively be dependent on a user, a group of users, a location, a device, a logon, a time, a relative time etc. For example, a given data object may be subject to different access policies if a user wishes to access it via different devices. Thus the logical relationship between one or more access control policies and a particular data object can be selected as appropriate.

As such, an access control policy may be assigned to the data object. Alternatively or additionally, it may be assigned to any other entity (for example, users, groups of users or devices) within the system.

As well as the logical relationship, there may be a model for physical distribution of the relevant access control policies. In some preferred embodiments, this distribution can be achieved by tying the access control policy to the data, but alternatively, the access control policy or policies may be distributed independently of the data. For example, the remote service 10 may manage the distribution of relevant access control policies.

Figure 2:
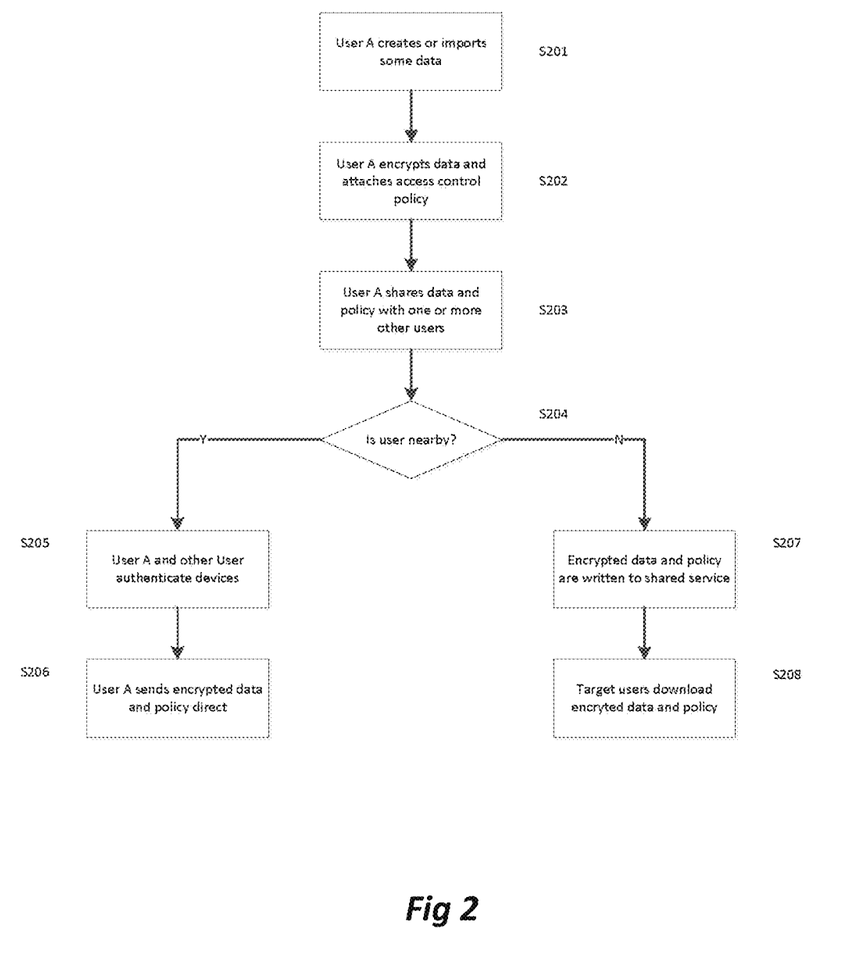
FIG. 2 is a flow diagram illustrating a process for sharing encrypted data and an access control policy according to a first embodiment.
Figure 3:
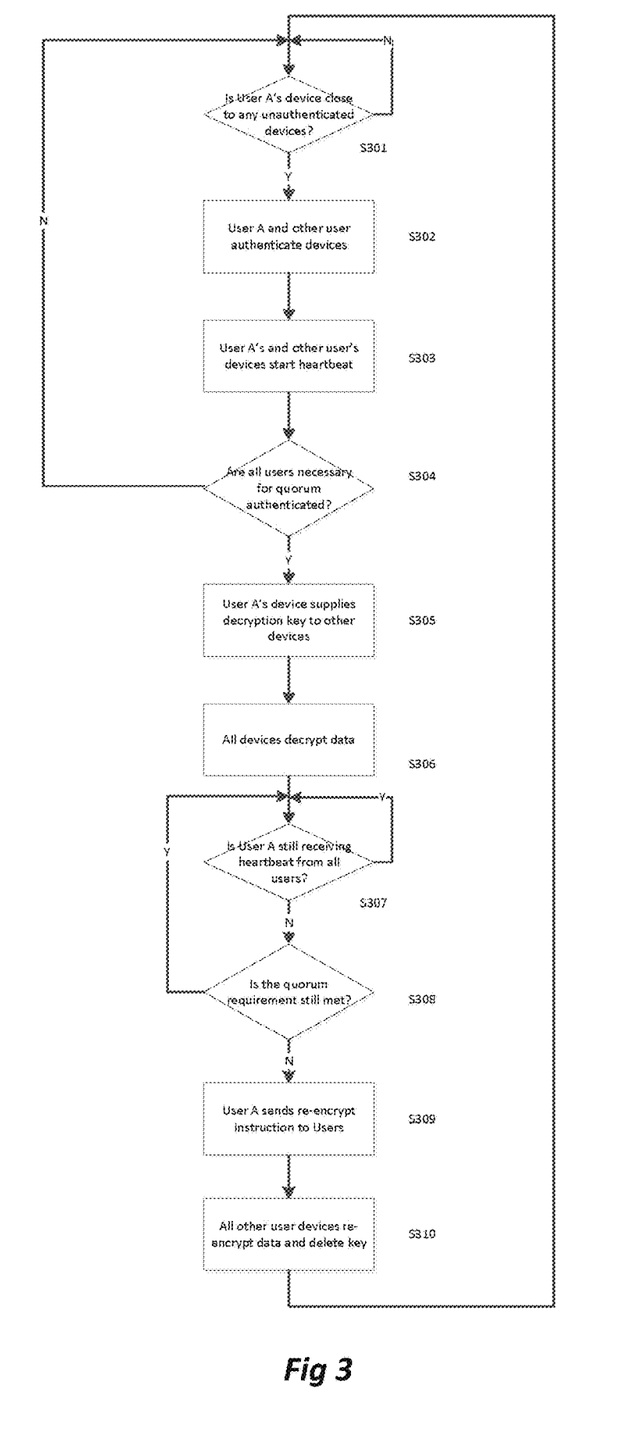
FIG. 3 is a flow diagram showing a process for decrypting data according to the first embodiment.

Operation of the system shown in FIG. 1 can be understood with reference to FIGS. 2 and 3, which show flow diagrams for methods of securely sharing data within the system. FIGS. 2 and 3 describe a scenario where User A has full access to the data and controls access for all other users i.e. A trusts no one else, everyone else trusts A.

At step S201, User A creates an item of data or imports it into the application on the associated client device 20. As mentioned above, this data may be structured data, a file, a photograph, streaming data or otherwise.

User A decides to share this data with one or more other users. To protect the data from unauthorised access, at step S202 User A causes their associated client device 20 to encrypt the data and attaches an access control policy to the data before sharing it.

The binding between the data and the policy will be protected to ensure that any changes can be detected. This can be achieved by a Message Authentication Code (MAC), Digital signature (DS), or some other means that is not the subject of this application.

The access control policy may include the set of users permitted to access the data, at least one collaborative condition and a predetermined number associated with the at least one collaborative condition. The policy may specify that if a predetermined number of users meet the collaborative condition then access will be provided to the data.

In the illustrated example, the collaborative condition is a proximity requirement specifying client devices must be proximate to one another. This is a relative geographic condition as it relates to the relative locations of the client devices 20. The predetermined number defines a quorum of users that must meet this requirement in order for the data to be shared. As such, the access control policy requires that some or all of the other users (the quorum) must be physically close to User A and to each other before the data can be decrypted and accessed by the other users.

The access control policy may further require that access is only provided while the collaborative condition is met by the quorum of users. For example, the access control policy may specify that the quorum must continue to be physically close to User A to be able to continue to access the decrypted data.

The access control policy may additionally include a time limit specifying how long the other Users may continue to access the data after the proximity requirement has been met.

The access control policy may additionally include a temporal condition which must be met for access to the data to be provided. For example, time window(s) specifying when the data may be decrypted and accessed by the other users may be incorporated into the access control policy. This temporal condition may be absolute (i.e. specified with reference to a set time point or period) or may be relative (i.e. specified with reference to an event such as another user complying with the collaborative condition).

Where accurate timings are critical to operation, a secure time-source may be provided, e.g. its identity can be authenticated to verify its trustworthiness.

As previously discussed, the access control policy may require the use, by a predetermined number of users, of predefined devices. Once a sufficient, predetermined number of users are using a predefined device, then access to the data object may be provided.

The access control policy may require the use, by a predetermined number of users, of a predefined application. Once a sufficient, predetermined number of users have logged on to a predefined application, such that an instance of one of the applications is running on each of their devices, then access to the data object may be provided.

The access control policy may additionally include a further collaborative condition comprising one or more absolute geographic requirements specifying the geographic locations where the data may be decrypted and accessed by the other users. In order to ensure accurate geo-location, the location-source (for example, GPS signals or similar) may be secure, e.g. its identity can be authenticated to verify its trustworthiness.

At step S203, client device 20 of User A shares the encrypted data and access control policy with the other Users' client devices 20. This may be done via the remote service 10.

At step S204, a judgement is made as to whether if any of the others client devices 20 are currently close to the client device 20 of User A. If so, User A's client device 20 may transfer the encrypted data and access control policy directly to their devices via communication interfaces on each device 20. Alternatively, encrypted data may be shared even if the client devices 20 are remote from one another. For example, transfer of the encrypted data may be facilitated by the remote service 10.

Where one or more further client devices 20 are located proximate to User A's client device 20 the method proceeds to step S205, where the client devices 20 authenticate each other. This step of authentication may use short-range wireless communications e.g. Wi-Fi, Bluetooth, near field communication (NFC), infrared communication, or another appropriate mechanism. To ensure that the device cannot be used when the legitimate user is not present some other sort of verification (e.g. PIN entry by user) may also be required.

Once authenticated, the client device 20 of User A may transfer the encrypted data and access control policy from their device to the other users' devices where it can be persisted at step S206.

Alternatively or additionally, User A may share the encrypted data and access control policy via the remote service 10. User A's client device 20 uploads the data to the accounts of each of the users they wish to share the data with at step S207. As the data is encrypted the operator of the communications network is unable to access the data.

The client devices of the users to whom A has granted access may now download the encrypted data and access control policy from their accounts on the remote service 10 at step S208.

In the example illustrated in FIGS. 2 and 3, the collaborative condition defined by the access control policy is that other client devices 20 users must be physically close enough to the device of User A to authenticate then maintain a heartbeat (i.e. a regular signal exchanged by short range communication between devices). To gain access to the data, a predetermined number of other client devices 20 (and hence the users associated with them) must meet this condition. This predetermined number represents a quorum of users in this example.

At step S301 a judgement is made as to whether any other devices 20 are proximate to the device 20 of User A. When the devices 20 are co-located (i.e. meet the collaborative condition), user A may authenticate their device 20 with each other user's device 20 at step S302 using short-range wireless communications e.g. Wi-Fi, Bluetooth, near field communication (NFC), or infrared.

Once authenticated, User A's device 20 and the other user's device 20 set up a heartbeat—a regular signal between the two devices 20 using a short-range wireless communication medium. The heartbeat contains a predictably changing value and is encrypted so no third party is able to snoop on the communication and/or replay it.

User A continues to authenticate devices and start heartbeats until the quorum requirement is met at step S304.

At step S305, User A's device 20 sends the encryption key required to decrypt the data to all other devices 20 that are present and authenticated.

The other devices 20 decrypt the data at step S306. User A's device 20 can continue to authenticate additional devices.

User A's device 20 continues to monitor the heartbeats from the devices of the other users they have authenticated at step S307. If the device 20 of a user leaves the area, closes the application or is turned off their heartbeat will cease. When A's device detects that a heartbeat has stopped, it checks whether the quorum requirement is still met at step S308 i.e. are enough other users present to fulfil the requirement. If so, no action is taken.

If the quorum requirement is no longer fulfilled, A sends a re-encryption instruction to all remaining devices 20 at S309. The other users' devices 20 will immediately re-encrypt the shared data and delete the encryption key at step S310.

User A can continue to authenticate devices at step S301. If at any stage the quorum requirement is met, user A's device will resend the decryption instruction.

If any device loses the heartbeat from user A's device, the device will immediately re-encrypt the shared data and delete the encryption key.

In the above embodiment, User A has full access to the data and controls access for all other users i.e. A trusts no one else, everyone else trusts A. In alternative embodiments, once user A has submitted the data and set its access control policy no single user can have sole access to the data, including A themselves (i.e. no one trusts anyone else). An example of such an embodiment can be understood with reference to FIGS. 4 and 5.

If the remote service 10 is itself untrusted, then prior to this sequence it is assumed that all users involved have created a public/private key pair for an asymmetric encryption system e.g. RSA, and have distributed their public keys to user A. All subsequent communications will be encrypted using these keys preventing the operators of the remote service 10 from intercepting the communications.

Figure 4:
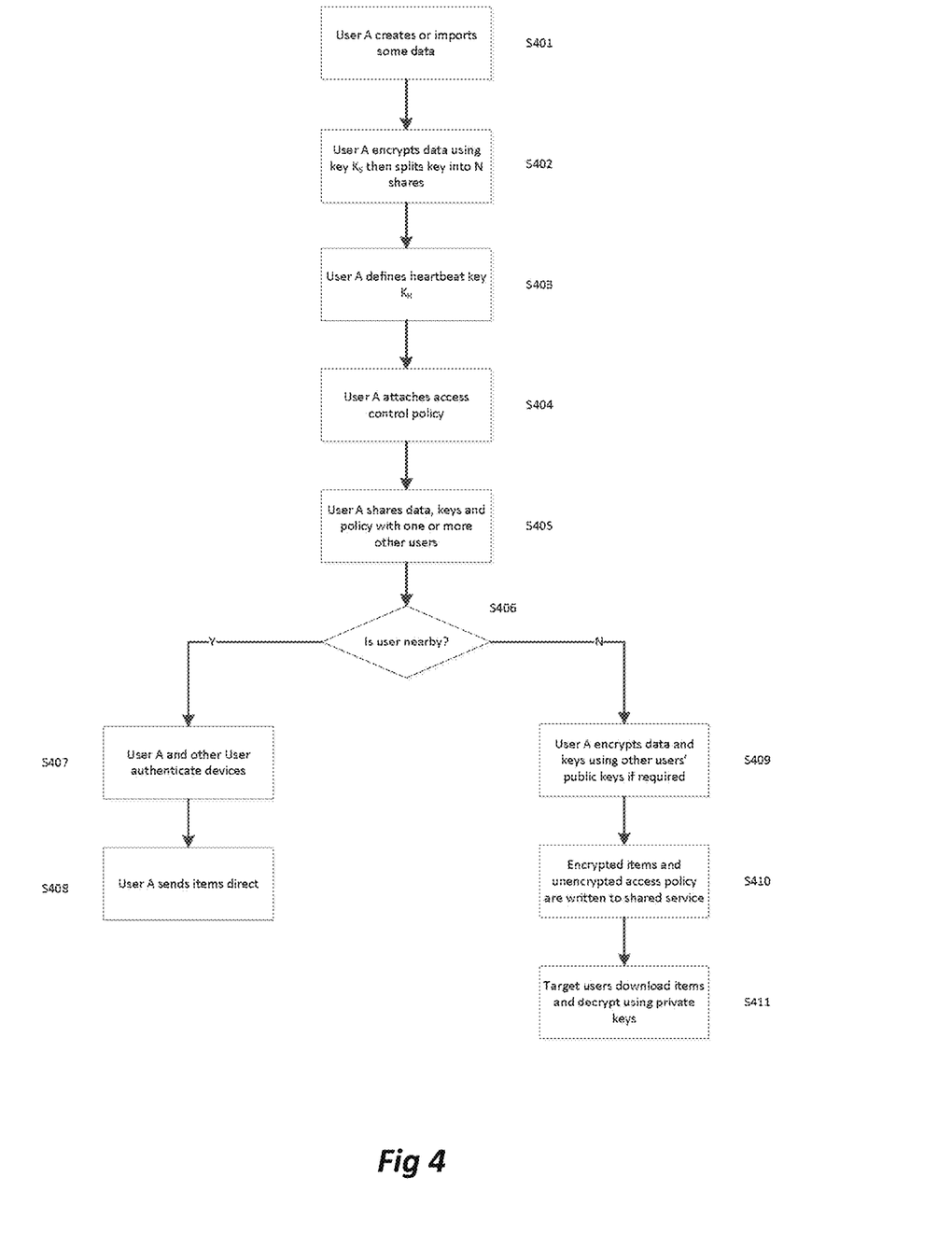
FIG. 4 is a flow diagram illustrating a process for sharing encrypted data and an access control policy according to a second embodiment.

Referring to FIG. 4, at step S401, user A creates an item of data and imports it into the application on their device 20. As previously, this data may be structured data, a file, a photograph, or otherwise.

User A decides to share this data with n users (including user A themselves) in such a way that no single user can access it unless some or all of the other users (including user A themselves) are physically close to them. That is to say, User A sets a collaborative condition of proximity, a permitted set of users and requires a predetermined number of these users (i.e. a quorum) including or not including User A to meet this condition before access is provided. This is incorporated into an access control policy for the data.

To achieve this, at step S402 User A encrypts the data using a symmetric encryption algorithm using an encryption key $K_S$. User A then uses a secret sharing algorithm to split the encryption key $K_S$ into n shares, such that the key can only be reconstituted when m of n shares are combined, where m<=n.

At step S403, user A defines another symmetric encryption key $K_H$ to protect the heartbeat used at the later reconstitution stage.

At step S404, user A attaches the access control policy to the data before sharing it. The binding between the data and the policy will be protected to ensure that any changes can be detected. This can be achieved by a Message Authentication Code (MAC), Digital signature (DS), or some other means that is not the subject of this application.

The access control policy is equivalent to the access control policy described with reference to FIGS. 2 and 3. In particular, it may include at least one collaborative condition and a predetermined number associated with the at least one collaborative condition. The policy may specify that if a predetermined number of specified users meet the collaborative condition then access will be provided to the data.

In this particular example, the access control policy will define a collaborative condition of proximity with a requirement specifying that at least m users (a quorum) must be physically close to each other before the data can be decrypted and accessed by the other users.

The access control policy may further require that access is only provided while the collaborative condition is met by the quorum of users. For example, the access control policy may specify that the quorum must continue to be physically close to User A to be able to continue to access the decrypted data.

The access control policy may additionally include a time limit specifying how long the other Users may continue to access the data after the proximity requirement has been met.

The access control policy may additionally include a temporal condition which must be met for access to the data to be provided. For example, time window(s) specifying when the data may be decrypted and accessed by the other users may be incorporated into the access control policy.

The access control policy may additionally include a geographic requirement(s) specifying the geographic location(s) where the data may be decrypted and accessed by the other users.

The access control policy may require the use, by a predetermined number of users, of a predefined device.

The access control policy may require the use, by a predetermined number of users, of a predefined application.

At step S405, user A prepares to distribute the complete encrypted data and shares of the key $K_S$, and the access control policy to the other users.

At step S406 an assessment is made as to whether one or more client devices 20 of other users are nearby. If so, the client device 20 of user A may transfer these items directly to these devices 20.

In this case, the devices must first be authenticated to each other at step S407. This can be implemented using communications techniques such as short-range wireless communications e.g. Wi-Fi, Bluetooth, near field communication (NFC), infrared communication.

Once authenticated, user A may transfer the items from their device 20 to the other user(s) device(s) 20 where it can be persisted at step S408.

Alternatively or additionally, user A may share the items via the remote service 10. Because the owner of the remote service 10 could potentially reconstitute the data from the individual shares that it stores, user A may first encrypt the data and encryption keys $K_S$ and $K_H$ using each target user's public key at step S409.

User A uploads the encrypted items and the access control policy to the accounts of each of the users they wish to share the data with at step S410. As the data is encrypted the operator of the remote service is unable to access the items.

At step S411 the users to whom A has granted access may now download the encrypted items and access control policy from their accounts on the remote service 10.

In accordance with the access control policy, to gain access to the data, the devices 20 of enough users to form a quorum must be physically close enough to each other to maintain a heartbeat. This quorum may or may not include user A.

Figure 5:
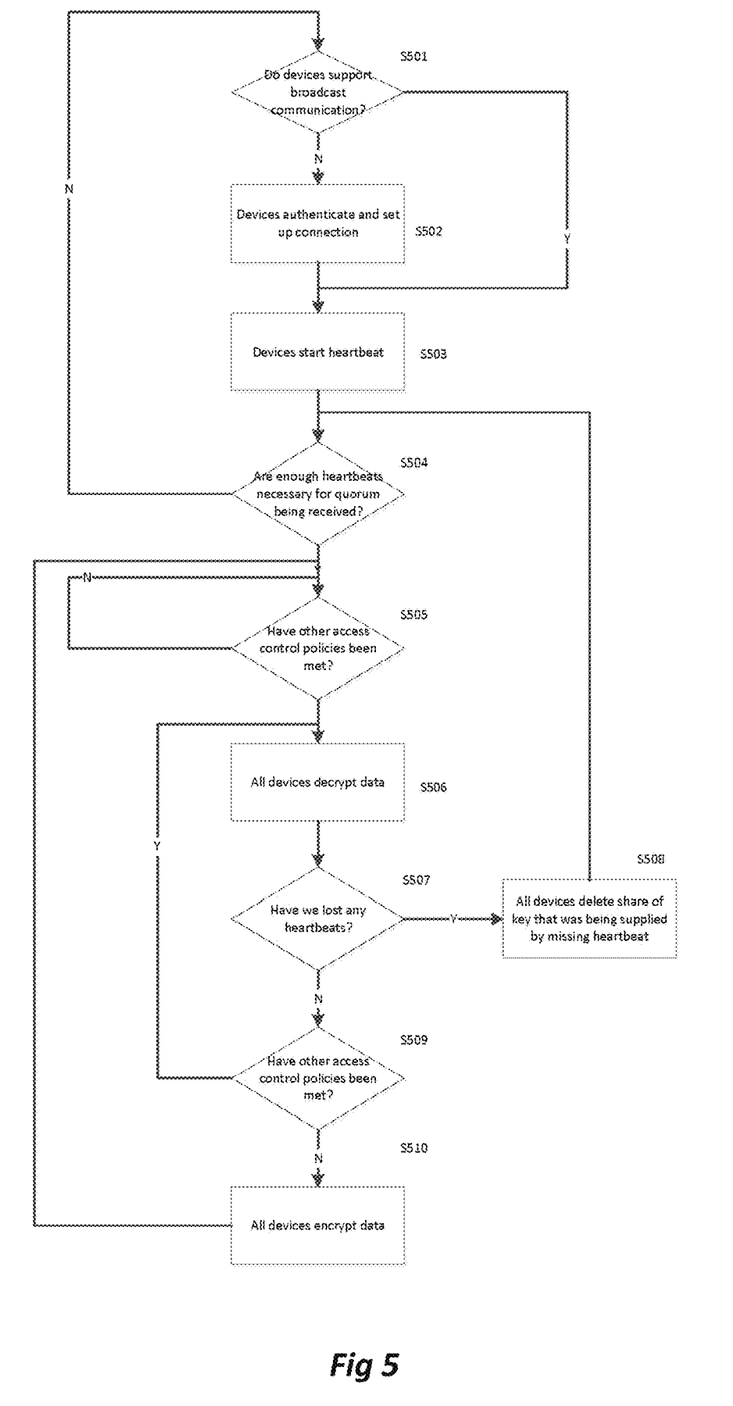
FIG. 5 is a flow diagram showing a process for decrypting data according to the second embodiment.

Referring to FIG. 5, a process for decrypting data in accordance with the access control policy can be understood. At step S501, an assessment of device capabilities is carried out, including whether the devices 20 support broadcast communication. If so, the process may move to step S503, but if not a set-up step S502 may be implemented to effect communications between the devices 20. For example, if the devices do not support broadcast, each user may authenticate their device with every other user's device at step S502 using short-range wireless communications e.g. Wi-Fi, Bluetooth, near field communication (NFC), infrared. Once authenticated, each user's device sets up a wireless connection to the other device and starts transmitting a heartbeat signal at step S503. Each user continues to authenticate devices and start heartbeats.

If the devices support short-range broadcast communication such as Bluetooth Low Energy (BLE), each device can start broadcasting their heartbeat at step S503 to all devices capable of receiving it in the area.

In either case, the heartbeat will contain the device's share of $K_S$, the key used to encrypt the data in step S404. The heartbeat will be encrypted using $K_H$ and will contain a changing value so no third party is able to snoop on the communication and/or replay it.

Thus devices may assess whether sufficient heartbeats are being received to meet the proximity requirements of the access control policy at step S504. If so, each device is receiving m heartbeats providing sufficient shares of $K_S$ to decrypt the data. The device further checks whether all other conditions of the access control policy are met at step S505 (for example, whether a temporal or absolute geographic condition is met). If so, the device will then reconstitute the key $K_S$ and decrypt the data at step S506.

Each user's device 20 can continue to authenticate additional devices 20 and start transmitting heartbeats or start broadcasting heartbeats.

If a device 20 leaves the area, closes the application or is turned off its heartbeat will cease. When the other devices 20 detect that a heartbeat from a particular peer has stopped at step S507, they delete that peer's share of $K_S$ at step S508 then check whether the quorum requirement is still met i.e. are enough other users present to fulfil the requirement. If so, no action is taken.

If the quorum requirement is no longer fulfilled, all devices immediately re-encrypt the shared data.

Continuous monitoring of other access control policy conditions may be carried out at step S509. If any other access control policy defined in step S404 is not met, all devices immediately re-encrypt the shared data at step S510.

Each device 20 can continue to authenticate additional devices 20 and start transmitting heartbeats or start broadcasting heartbeats. If at any stage the quorum requirement is met again, they will be able to reconstitute the key $K_S$ and decrypt the data at step S506.

In the above examples, the access control policy enforces a proximity requirement as a collaborative condition. A proximity requirement of this type is an example of a relative geographic condition, defining a relative position of different devices. As mentioned above, alternative collaborative conditions may also be employed, such as temporal or absolute geographic conditions and the use, by a predetermined number of users, of predefined devices and/or predefined applications. Furthermore, the access control policy may enforce additional conditions on access, such as security enforced through passwords and logins or through a clearance level model in which each data object is classified as a particular category and only users or devices entitled to access that category of data may be provided with access. Such requirements may be enforced in addition to the collaborative conditions described herein (e.g. access is only provided if all requirements are met) or as an alternative (e.g. a user may be provided access either because the collaborative condition has been met by sufficient users or because they have sufficient clearance to bypass this policy requirement).

It should also be understood that a combination of collaborative conditions may be met in order to enable access. For example, one user may meet a first collaborative condition through physical presence at a given location (i.e. an absolute geographic condition) while another user may meet a second collaborative condition requiring login to an online portal. The access policy that it does not matter which collaborative condition has been met for access to be granted as long as a sufficient number of users has met at least one condition.

Details and preferred features of each embodiment and aspect of the invention described herein apply mutatis mutandis to all other embodiments and aspects of the invention.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination. It should be noted that the term "comprising" does not exclude other elements or steps, the term "a" or "an" does not exclude a plurality, a single feature may fulfill the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method for enabling collaborative access to a data object, comprising:
   establishing an access control policy, the access control policy defining at least one collaborative condition under which access to the data object is permissible and at least one relative temporal condition;
   monitoring a plurality of users for compliance with the collaborative condition; and
   providing access to the data object only after a predetermined number of the users meet the at least one collaborative condition within a predetermined time period relative to each other, wherein the predetermined number of said users is greater than one and wherein the collaborative condition comprises:
   a) the use of a predefined device by each user, wherein the predefined device is a device identified as usable by a user to meet the collaborative condition; and/or
   b) the use of a predefined application by each user.

2. A method according to claim 1 wherein, when the collaborative condition comprises the use of a predefined device by each user, a predefined device is associated with each user.

3. A method according to claim 2 wherein a single device is associated with each user or wherein a plurality of devices are associated with each user.

4. A method according to claim 1 wherein, when the collaborative condition comprises the use of a predefined application by each user, a predefined application is associated with each user.

5. A method according to claim 4 wherein a single application is associated with each user or wherein a plurality of applications are associated with each user.

6. A method according to claim 1, further comprising preventing access to the data object when the predetermined number of the users no longer meet the at least one collaborative condition.

7. A method according to claim 6, wherein access to the data object is prevented when a predefined time period has elapsed since the predetermined number of the users met the at least one collaborative condition.

8. A method according to claim 1, wherein the step of monitoring comprises:
   a) regularly polling one or more devices associated with the users to assess compliance with the collaborative condition; or
   b) monitoring one or more signals emitted by devices associated with the users.

9. A method according to claim 1, further comprising a geographical collaborative condition selected from an absolute geographical condition and a relative geographical condition.

10. A method according to claim 9, wherein monitoring for compliance with the geographical collaborative condition comprises determining the geographic location of devices associated with the users using one or more of global positioning system (GPS), general packet radio service (GPRS), beacon or internet protocol (IP) address information.

11. A method according to claim 1, wherein the access control policy further comprises at least one absolute temporal condition, and wherein the step of providing access to the data object is dependent on compliance with the absolute temporal condition.

12. A method according to claim 1, wherein the data object is encrypted and;
   a) the step of providing access to the data object comprises sharing an encryption key; or
   b) the encryption key is split using a secret sharing algorithm and its parts distributed between the users, wherein the predetermined number of the users represents the number of parts of the encryption key required to access the data object.

13. A method according to claim 1, further comprising sharing the data object prior to the step of monitoring the plurality of users for compliance with the collaborative condition.

14. A computer program product comprising computer executable instructions for carrying out the method of claim 1.

15. A system for enabling collaborative access to a data object, comprising processing means configured to:
   establish an access control policy, the access control policy defining at least one collaborative condition under which access to the data object is permissible and at least one relative temporal condition;
   monitor a plurality of users for compliance with the collaborative condition; and
   provide access to the data object only after a predetermined number of the users meet the at least one collaborative condition within a predetermined time period relative to each other, wherein the predetermined number of said users is greater than one and wherein the collaborative condition comprises:
   a) the use of a predefined device by each user, wherein the predefined device is a device identified as usable by a user to meet the collaborative condition; or
   b) the use of a predefined application by each user.

16. A method for enabling collaborative access to a data object, comprising:
   establishing an access control policy, the access control policy specifying at least one collaborative condition under which access to the data object is permissible, at least one relative temporal condition, and:
   a) predefined devices identified as usable by users to meet the collaborative condition;
   b) one or more predefined applications; or
   c) predefined constituent data sets, wherein the data object comprises the constituent data sets;
   monitoring a plurality of the predefined devices, applications or constituent data sets for compliance with the collaborative condition; and
   providing access to the data object only after a predetermined number of the predefined devices, applications or constituent data sets meet the at least one collaborative condition within a predetermined time period relative to each other.

17. A method according to claim 16, further comprising preventing access to the data object when the predetermined number of the devices, applications or constituent data sets no longer meet the at least one collaborative condition.

18. A method according to claim 17, wherein access to the data object is prevented when a predefined time period has elapsed since the predetermined number of the devices, applications or constituent data sets met the at least one collaborative condition.

19. A method according to claim 16, wherein the step of monitoring comprises:
   a) regularly polling one or more of the devices, applications or constituent data sets to assess compliance with the collaborative condition; or
   b) monitoring one or more signals emitted by the devices.

20. A method according to claim 16, wherein the collaborative condition comprises a geographical condition selected from an absolute geographical condition and a relative geographical condition.

21. A method according to claim 20, wherein monitoring for compliance with the geographical condition comprise determining the geographic location of the devices using one or more of global positioning system (GPS), general packet radio service (GPRS), beacon or internet protocol (IP) address information.

22. A method according to claim 16, wherein the access control policy further comprises at least one absolute temporal condition, and wherein the step of providing access to the data object is dependent on compliance with the absolute temporal condition.

23. A method according to claim 16, wherein the access control policy specifies predefined devices and the collaborative condition comprises the use of a predefined application on each device.

24. A method according to claim 16, wherein the data object is encrypted and;
   a) the step of providing access to the data object comprises sharing an encryption key; or
   b) the encryption key is split using a secret sharing algorithm and its parts distributed between the devices or applications, wherein the predetermined number of the devices or applications represents the number of parts of the encryption key required to access the data object.

25. A method according to claim 16, further comprising sharing the data object prior to the step of monitoring the plurality of devices, applications or constituent data sets for compliance with the collaborative condition.

26. A computer program product comprising computer executable instructions for carrying out the method of claim 16.

27. A system for enabling collaborative access to a data object, comprising processing means configured to:
   establish an access control policy, the access control policy specifying at least one collaborative condition under which access to the data object is permissible, at least one relative temporal condition, and:
  a) predefined devices identified as usable by users to meet the collaborative condition;
  b) one or more predefined applications; or
  c) predefined constituent data sets, wherein the data object comprises the constituent data sets;
monitor a plurality of the predefined devices, applications or constituent data sets for compliance with the collaborative condition; and
provide access to the data object only after a predetermined number of the predefined devices, applications or constituent data sets meet the at least one collaborative condition within a predetermined time period relative to each other.

* * * * *